Patented Apr. 6, 1926.

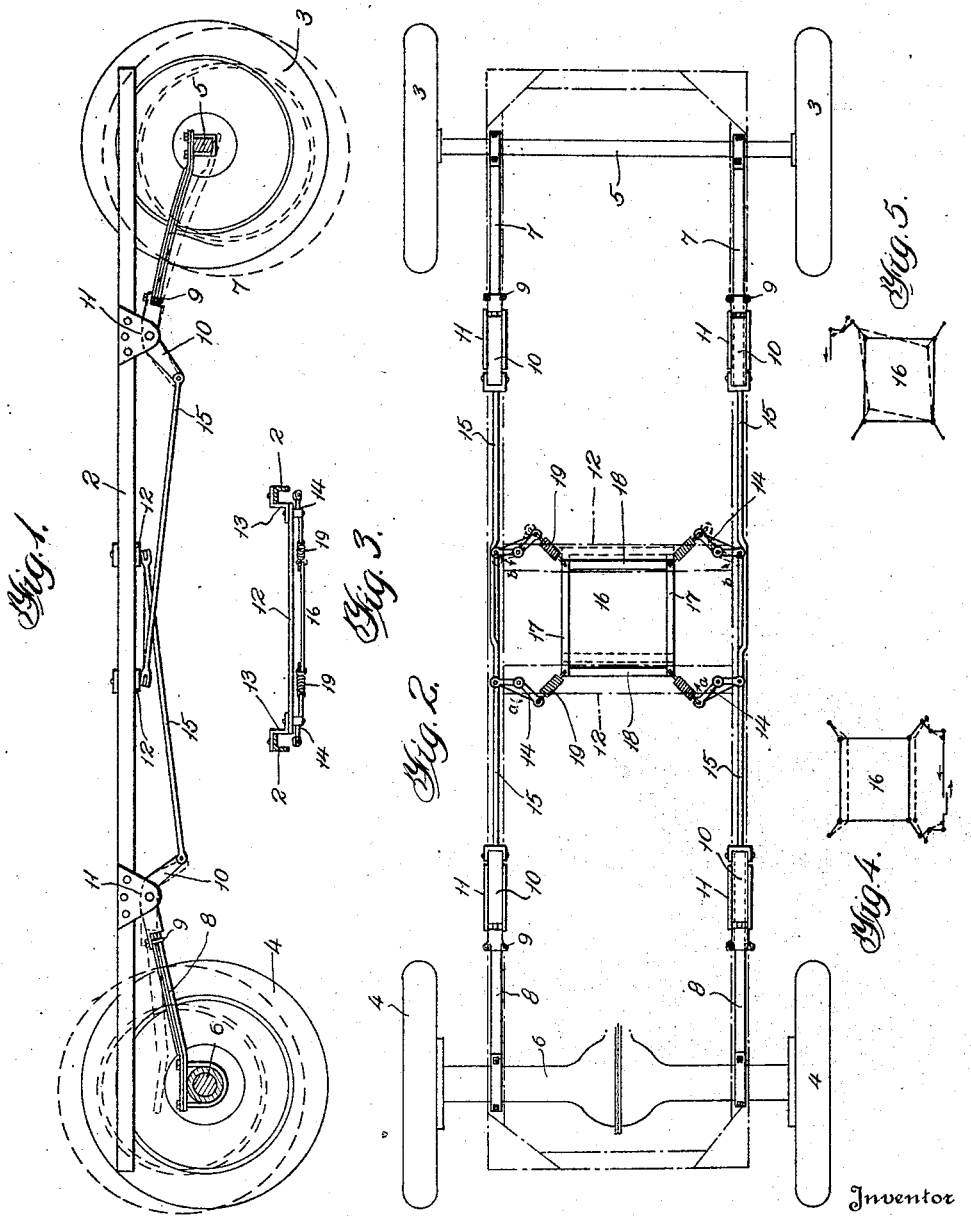

1,579,233

UNITED STATES PATENT OFFICE.

ARTHUR R. MISKIN, OF UCON, IDAHO.

COMPENSATING SPRING SUSPENSION FOR VEHICLES.

Application filed February 9, 1924. Serial No. 691,713.

*To all whom it may concern:*

Be it known that I, ARTHUR R. MISKIN, a citizen of the United States, residing at Ucon, in the county of Bonneville and State of Idaho, have invented certain new and useful Improvements in Compensating Spring Suspensions for Vehicles, of which the following is a specification.

My invention relates to compensating spring suspension apparatus for vehicles, being devised with especial reference to its application to motor vehicles. It has for its object to interconnect the suspension springs which are individual to the several wheels of the vehicle by compensating mechanism of novel construction adapted to distribute between the said springs the vibrations imparted thereto by the movements of the road wheels as they pass over obstructions and into ruts along the roadway.

In the accompanying drawings—

Figure 1 is a side elevation of the chassis of an automobile to which my invention is applied.

Fig. 2 is a bottom plan view of the same.

Fig. 3 is a transverse sectional view on the line III—III of Fig. 2; and

Figs. 4 and 5 are diagrammatic views indicating different positions of the compensating mechanism.

In the drawings 2 designates the chassis, which is not illustrated in detail, 3 the front wheels, 4 the rear wheels, 5 the front axle, 6 the housing of the rear axle, 7 the front springs, and 8 the rear springs. The springs are represented as being of the quarter elliptic, leaf type, their free, thin ends being secured respectively to the axles, and their thick ends seated in sockets 9 formed therefor in angle levers 10 which are pivotally supported in hangers or brackets 11 secured to the chassis frame. The ends of the levers 10 opposite the spring sockets 9 are connected, respectively, by links 15, with bell crank levers 14, supported upon cross bars or plates 12, united with the longitudinal bars of the chassis frame by the brackets 13. I prefer that the links 15 should cross each other as represented in Fig. 1, that from a front lever 10 extending to the rear bell crank lever 14, and vice versa, as by this arrangement, which necessitates lengthening the links 15, there is less variation from a common working plane in the movements of the links 15 than would be the case were they shorter. The levers 14 are respectively connected to the corners of a floating parallelogram linkage arrangement 16, consisting of the longitudinal bars 17, and the transverse bars 18, pivotally united with each other at the corners of the parallelogram. The connections between the levers 14 and the parallelogram 16 are represented as being fairly stiff coiled springs 19, although non-extensible connections might be employed in lieu of the springs.

The positions which the parts that have been described assume when the vehicle is standing upon or traveling over a plane surface is indicated in full lines in Figs. 1 and 2; while the positions assumed should the front wheels suddenly drop into a rut and, at the same instance, the rear wheels pass over an obstruction, are represented by dotted lines in the said views. When the front wheels fall, the springs 7 and levers 10 to which they are attached, rock into the position indicated by dotted lines, shifting the links 15 to the rear, and rocking the rear bell crank levers 14 as indicated by the arrows *a*. This somewhat relieves the springs 19 of tension, permitting the parallelogram 16 to move forward toward the position represented in dotted lines in Fig. 2. Under the conditions supposed and while this is taking place the rear wheels are lifted, moving the springs 8 and the levers 10 to which they are connected into the dotted line position indicated in Fig. 1, and drawing toward the rear the links 15 connected to such levers. These movements rock the forward bell crank levers 14 as indicated by the arrows *b*, Fig. 2, and increase the tension upon the springs 19 connected with such levers, which tend to move the parallelogram 16 forward or into the dotted line position of Fig. 2. It will thus be seen that the vertical movements of the road wheels just described all tend to move the parallelogram in the same direction and to equalize the tension upon the springs amongst them all. Should the wheels move irregularly, as represented in Figs. 4 and 5, the compensating mechanism connecting the springs operates to distribute and equalize the strains placed upon the springs. Thus, as represented in Fig. 4, the two right hand wheels of a vehicle traveling in the direction of the arrow A are supposed to be simultaneously lifted, while the left hand wheels drop at the same instance. The result is that the connecting parts are moved as indicated in the diagram, and the floating parallelogram is shifted bodily toward the right.

In Fig. 5 the forward right hand wheel is supposed to have dropped, the forward left hand wheel to have been raised, the rear right hand wheel to have maintained a normal position, neither rising or falling, and the rear left hand wheel to have dropped, these wheel movements taking place simultaneously. The result is that the lever and linkage connections between the springs assume the positions diagrammatically indicated in this view, the angles between the bars 17 and 18 ceasing for the moment to be right angles, but the bars opposite each other maintaining their parallel relations by virtue of the manner in which they are connected.

Whatever be the vertical movements of the wheels the motions imparted thereby are first directly transmitted to their individual supporting springs and through them transmitted to the compensating mechanism that unites all of the springs, with the result that the movements imparted to any one spring are immediately equalized to and distributed between all of the other springs of the system. Thus a violent, upward movement of one wheel,—which, with the ordinary spring arrangement now in vogue, would impart an excessive motion to the spring associated with that wheel and through such spring to the corner of the vehicle to which such spring is connected— when my invention is adopted is distributed to the other three springs, they in turn resisting the violent movements and injurious vibrations of the spring whose wheel is lifted, the result being that the entire body of the vehicle is lifted at its four corners, the extent of such lifting movement, however, being less than one-fourth of that which would be imparted to one corner thereof were the spring of the wheel lifted fastened rigidly to the chassis or running frame as in the ordinary manner.

The parallelogram, floating, linkage 16 transmits the movements between the springs instantly and easily, is comparatively simple in construction, is of relatively light weight, and may be arranged in position so as not to interfere with any of the other parts of the vehicle.

The springs 19 are of less tension than the springs 7 and 8 and may serve as shock-absorber springs. They may, however, be dispensed with entirely and non-extensible connections employed in their stead, as has been stated.

While I have represented but a single embodiment of my invention it is apparent that it may be practiced in different embodiments thereof without departing from the principal and essential features of the invention, as set forth in the claims hereof.

What I claim is:—

1. In a compensating apparatus for the suspension system of a land vehicle, the combination of body-supporting springs individual to the road wheels, and compensating connections between, and uniting, the several springs, including a floating parallelogram linkage, to which each spring is connected.

2. In a compensating apparatus for the suspension system of a land vehicle, the combination of body-supporting springs individual to the road wheels, a floating parallelogram linkage, levers adapted to be rocked by the vertical movements of the wheels as they pass irregularities in the road surface, and connections between the said rocking levers and the corners of the parallelogram linkage.

3. In a compensating apparatus for the suspension system of a land vehicle, the combination of body-supporting springs individual to the road wheels, a floating parallelogram linkage, levers adapted to be rocked by the vertical movements of the wheels as they pass irregularities in the road surface, and connections between each of the said rocking levers and the corners of the parallelogram linkage, including links and springs.

4. In a compensating apparatus for the suspension system of a land vehicle, the combination of body-supporting springs individual to the road wheels, a floating parallelogram linkage, levers adapted to be rocked by the vertical movements of the wheels as they pass irregularities in the road surface, and connections between each of the said rocking levers and the parallelogram linkage, including links connected at one end with the rocking levers and at their opposite ends with bell cranks, the bell cranks being connected respectively with the parallelogram linkage at its corners.

5. The combination stated in claim 4, including in the connection between the bell crank levers and the parallelogram linkage, springs.

ARTHUR R. MISKIN.